(12) United States Patent
Kimura

(10) Patent No.: US 11,060,489 B2
(45) Date of Patent: Jul. 13, 2021

(54) INLET DUCT FOR INTERNAL COMBUSTION ENGINE

(71) Applicant: TOYOTA BOSHOKU KABUSHIKI KAISHA, Aichi-ken (JP)

(72) Inventor: Ryusuke Kimura, Ichinomiya (JP)

(73) Assignee: TOYOTA BOSHOKU KABUSHIKi KAISHA, Aichi-ken (JP)

( * ) Notice: Subject to any disclaimer, the term of this patent is extended or adjusted under 35 U.S.C. 154(b) by 559 days.

(21) Appl. No.: 15/947,039

(22) Filed: Apr. 6, 2018

(65) Prior Publication Data

US 2018/0298855 A1    Oct. 18, 2018

(30) Foreign Application Priority Data

Apr. 18, 2017   (JP) .............................. JP2017-081871

(51) Int. Cl.
*F02M 35/12*  (2006.01)
*F02M 35/10*  (2006.01)
(Continued)

(52) U.S. Cl.
CPC ......... *F02M 35/1216* (2013.01); *B29D 23/00* (2013.01); *F02M 35/0218* (2013.01);
(Continued)

(58) Field of Classification Search
CPC ........... F02M 35/1216; F02M 35/0218; F02M 35/10098; F02M 35/10347; B29D 23/00;
(Continued)

(56) References Cited

U.S. PATENT DOCUMENTS 5,821,473 A * 10/1998 Takahashi ................. F01N 1/24
                                                          181/224
6,553,953 B1 * 4/2003 Fujihara ........... F02M 35/10347
                                                       123/184.21
(Continued)

FOREIGN PATENT DOCUMENTS

CN         1296550       5/2001
CN       205315878       6/2016
(Continued)

OTHER PUBLICATIONS

Official Action in corresponding Chinese Patent Application No. 201810329612.3, dated Feb. 26, 2020 (with English translation).
(Continued)

*Primary Examiner* — Forrest M Phillips
(74) *Attorney, Agent, or Firm* — Greenblum & Bernstein, P.L.C.

(57) ABSTRACT

An inlet duct for an internal combustion engine includes a duct member made of a compression molded fiber material. The duct member includes a main body and end portions provided on opposite sides in an axial direction of the main body. The main body includes at least one high-compression portion and at least one low-compression portion, which is made through compression molding at a compression ratio lower than that of the at least one high-compression portion. The at least one low-compression portion extends throughout a length in the axial direction of the main body.

10 Claims, 6 Drawing Sheets

(51) Int. Cl.
  *F02M 35/02* (2006.01)
  *B29D 23/00* (2006.01)
  *B29L 31/30* (2006.01)
  *B29C 43/02* (2006.01)
  *B29K 105/08* (2006.01)

(52) U.S. Cl.
  CPC ............... *F02M 35/10098* (2013.01); *F02M 35/10347* (2013.01); *B29C 43/021* (2013.01); *B29C 43/027* (2013.01); *B29K 2105/0854* (2013.01); *B29K 2867/003* (2013.01); *B29L 2031/3032* (2013.01)

(58) Field of Classification Search
  CPC ............... B29C 43/027; B29C 43/021; B29K 2105/0854; B29K 2867/003; B29L 2031/3032
  USPC ........................................................ 181/229
  See application file for complete search history.

(56) References Cited

U.S. PATENT DOCUMENTS

| 7,621,372 | B2* | 11/2009 | Yamaura | ................ | F02M 35/02 |
| | | | | | 123/184.21 |
| 7,802,651 | B2* | 9/2010 | Park | ................... | F02M 35/1272 |
| | | | | | 181/224 |
| 8,132,552 | B2* | 3/2012 | Matsumoto | ........ | F02M 35/1283 |
| | | | | | 123/184.61 |
| 8,327,975 | B2* | 12/2012 | Ortman | ............ | F02M 35/10104 |
| | | | | | 181/264 |
| 8,528,692 | B2* | 9/2013 | Teshima | ............. | F02M 35/1238 |
| | | | | | 181/229 |
| 10,309,559 | B2* | 6/2019 | Iwasaki | .............. | B60H 1/00564 |
| 10,486,097 | B2* | 11/2019 | Kimura | .............. | B01D 53/0407 |

FOREIGN PATENT DOCUMENTS

| JP | 01-85459 | 6/1989 |
| JP | 11-343939 | 12/1999 |
| JP | 2000-249010 | 9/2000 |
| JP | 2003-035225 | 2/2003 |

OTHER PUBLICATIONS

Office Action in Japan Patent Application No. 2017-081871, dated Jul. 21, 2020, together with English language translation thereof.
Office Action in Japan Patent Application No. 2017-081871, dated Dec. 8, 2020, together with English language translation thereof.

* cited by examiner

Fig.3
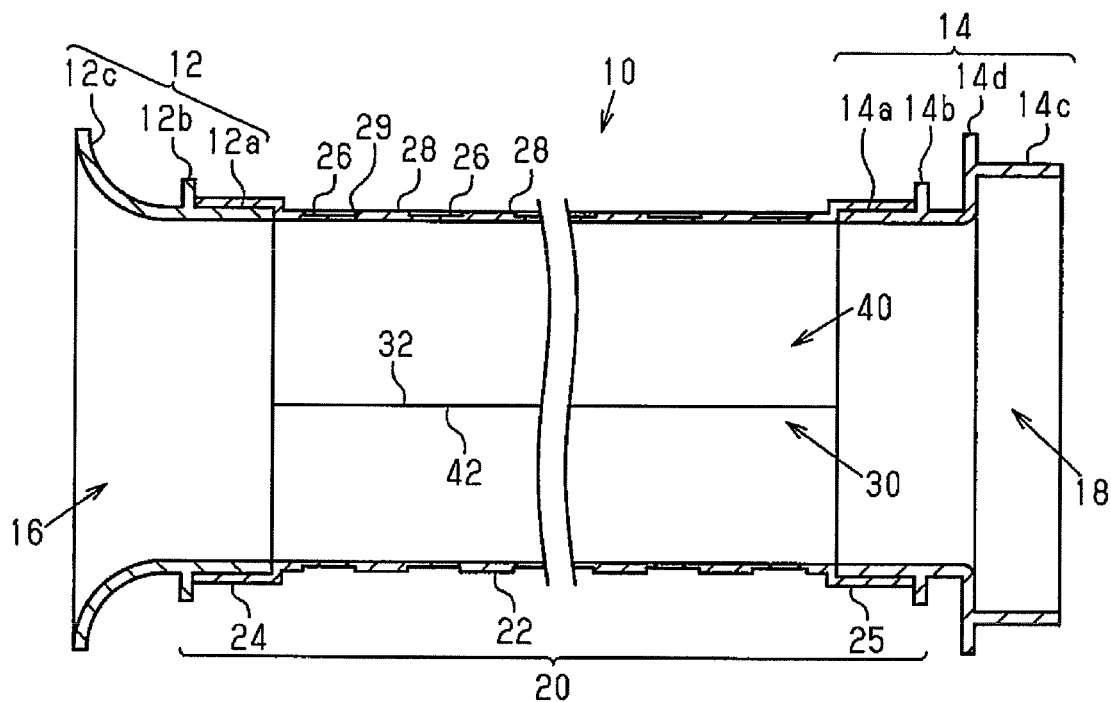
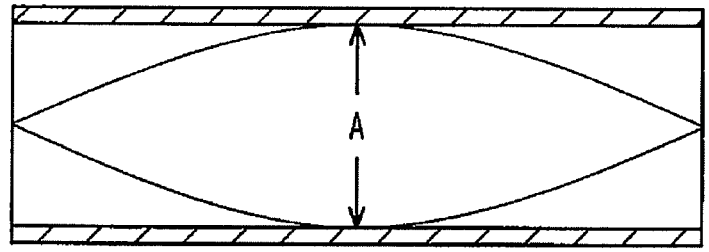
Fig.4A
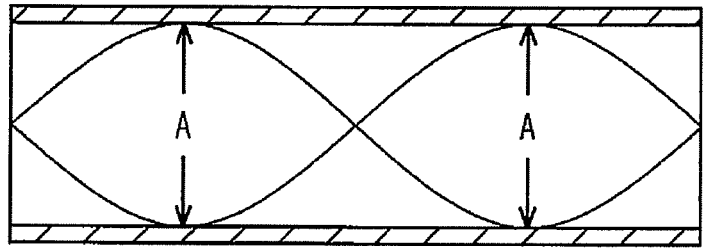
Fig.4B
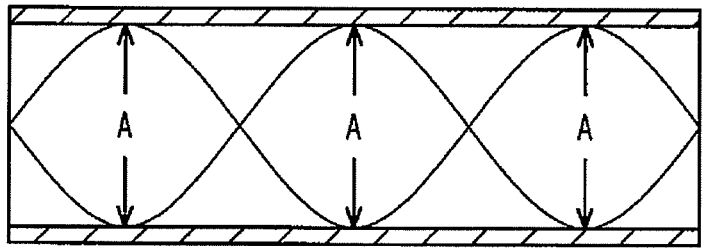
Fig.4C

INLET DUCT FOR INTERNAL COMBUSTION ENGINE

BACKGROUND

The present disclosure relates to an inlet duct for an internal combustion engine.

Japanese Laid-Open Patent Publication No. 11-343939 discloses an inlet duct for an internal combustion engine that is formed through compression molding of a nonwoven fabric containing thermoplastic resin binder. This inlet duct has hard portions of a high compression ratio and soft portions with a low compression ratio. According to Japanese Laid-Open Patent Publication No. 11-343939, at least part of the wall of the inlet duct is formed by a soft portion, which has a certain degree of air permeability. Thus, some of the sound wave of the intake air passes through the soft portion. This suppresses the generation of a standing wave of the sound wave of the intake air, thereby reducing the intake noise.

SUMMARY

Although the inlet duct for an internal combustion engine described in Japanese Laid-Open Patent Publication No. 11-343939 can reduce intake noise of specific frequencies, the inlet duct still has room for improvement in the reduction of intake noise in a wider frequency range.

Accordingly, it is an objective of the present disclosure to provide an inlet duct for an internal combustion engine capable of reducing intake noise of a wide frequency range.

In accordance with one aspect of the present disclosure, an inlet duct for an internal combustion engine is provided. The inlet duct includes a duct member made of a compression molded fiber material. The duct member includes a main body and end portions provided on opposite sides in an axial direction of the main body. The main body includes at least one high-compression portion and at least one low-compression portion, which is made through compression molding at a compression ratio lower than that of the at least one high-compression portion. The at least one low-compression portion extends throughout a length in the axial direction of the main body.

Other aspects and advantages of the present invention will become apparent from the following description, taken in conjunction with the accompanying drawings, illustrating by way of example the principles of the invention.

BRIEF DESCRIPTION OF THE DRAWINGS

FIG. 3 is a cross-sectional view shown in the inlet duct of FIG. 1.

FIGS. 4A to 4C show the pressure distribution of standing waves of the sound wave of the intake air generated inside the inlet duct of FIG. 1.

DETAILED DESCRIPTION OF THE PREFERRED EMBODIMENTS

First Embodiment

A first embodiment will now be described with reference to FIGS. 1 to 4.

Figure 1:
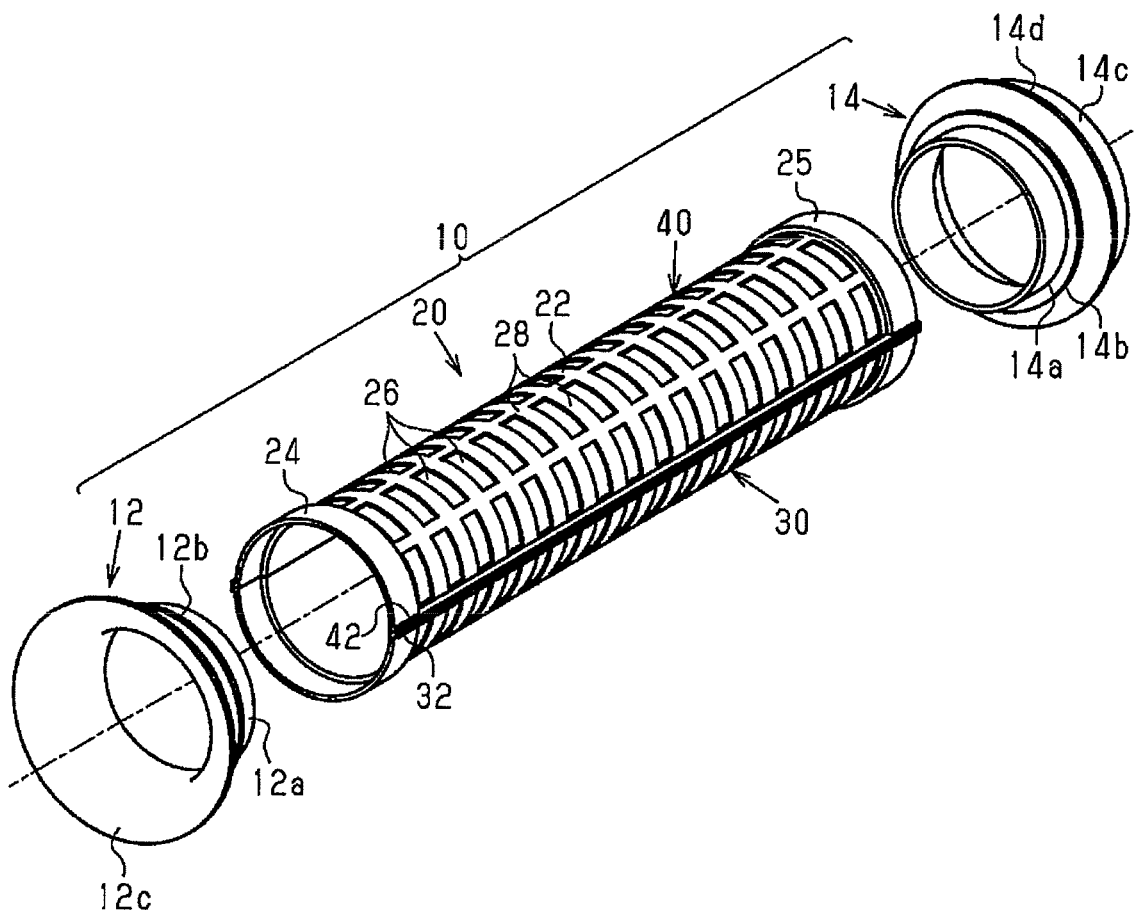
FIG. 1 is an exploded perspective view of an inlet duct for an internal combustion engine according to a first embodiment, illustrating a state in which an upstream-side connecting member, a duct member, and a downstream-side connecting member, which constitute the inlet duct, are separated from each other.
Figure 2:
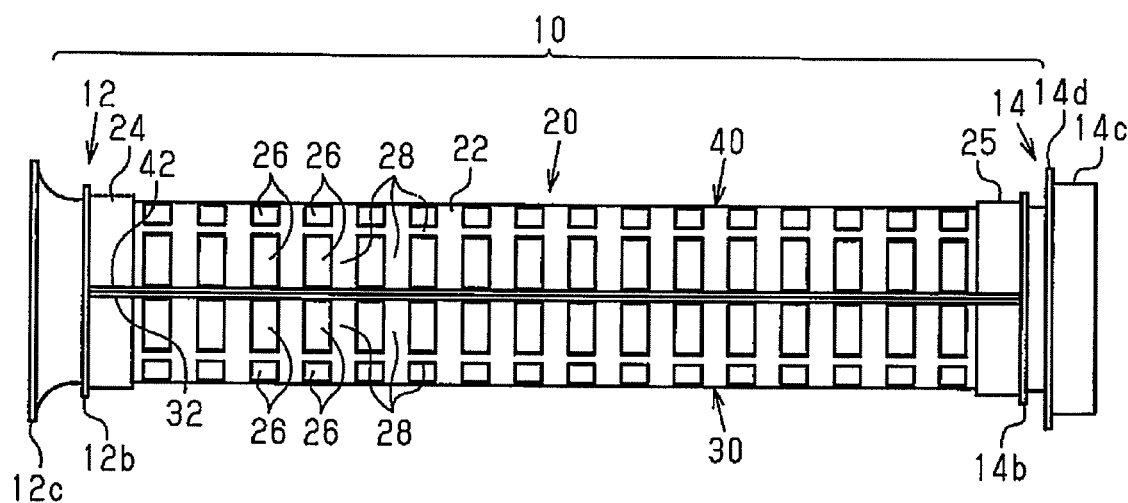
FIG. 2 is a side view of the inlet duct shown in FIG. 1.

As shown in FIGS. 1 to 3, an inlet duct 10 for an internal combustion engine includes a tubular upstream-side connecting member 12 made of a hard plastic, a duct member 20 made of a nonwoven fabric subjected to thermal compression molding, and a tubular downstream-side connecting member 14 made of a hard plastic. The inlet duct 10 is connected to the inlet of an air cleaner (not shown) and constitutes a part of the intake passage.

In the following description, the upstream side and the downstream side in the flow direction of intake air in the inlet duct 10 are simply referred to as an upstream side and a downstream side, respectively.

<Upstream-Side Connecting Member 12>

As shown in FIGS. 1 to 3, the upstream-side connecting member 12 constitutes an inlet 16 of the inlet duct 10 and includes a cylindrical connecting portion 12a, an annular flange portion 12b, which protrudes from the outer circumferential surface of the connecting portion 12a, and a funnel portion 12c, which is connected to the upstream end of the connecting portion 12a and has a diameter increasing toward the upstream end.

<Downstream-Side Connecting Member 14>

As shown in FIGS. 1 to 3, the downstream-side connecting member 14 constitutes an outlet 18 of the inlet duct 10 and includes a cylindrical first connecting portion 14a and an annular first flange portion 14b, which protrudes from the outer circumferential surface of the first connecting portion 14a. Also, the downstream-side connecting member 14 includes a second connecting portion 14c, which is connected to the downstream end of the first connecting portion 14a and has a larger diameter than the first connecting portion 14a, and an annular second flange portion 14d, which protrude from the outer circumferential surface of the second connecting portion 14c. The first connecting portion 14a and the second connecting portion 14c are coaxial, and a step is formed over the entire circumference between the first connecting portion 14a and the second connecting portion 14c.

<Duct Member 20>

As shown in FIGS. 1 to 3, the duct member 20 is formed by joining a first half body 30 and a second half body 40, each of which has the shape of a half cylinder.

The half bodies 30, 40 have the same shape. The half bodies 30, 40 respectively have a pair of joining portions 32, 42 at the opposite ends in the circumferential direction. The joining portions 32, 42 protrude outward in the radial direction and extend throughout the length in the axial direction.

The joining portions 32 of the first half body 30 and the joining portions 42 of the second half body 40 are joined together to form the duct member 20.

The nonwoven fabric constituting the half bodies 30, 40 is composed of known sheath-core bicomponent fibers including cores made of, for example, polyethylene terephthalate (PET) and sheaths made of a modified PET having a melting point lower than that of the PET of the cores (neither is illustrated). The modified PET functions as a binder that binds the bicomponent fibers together.

The modified PET preferably constitutes 30 to 70% of the bicomponent fibers. In the present embodiment, the modified PET constitutes 50% of the bicomponent fibers.

The bicomponent fibers may have cores made of polyethylene terephthalate (PET) and sheaths made of polypropylene (PP) having a melting point lower than that of PET (neither is shown).

The weight per unit area of the nonwoven fabric is preferably 500 to 1,500 g/m$^2$. In the present embodiment, the weight per unit area of the nonwoven fabric is 800 g/m$^2$.

The half bodies 30, 40 are formed by hot-pressing a nonwoven fabric sheet having a thickness of, for example, 30 mm to 100 mm.

The duct member 20 includes a main body 22 and end portions 24 and 25 provided on the opposite sides in the axial direction of the main body 22.

The main body 22 has multiple high-compression portions 26 and multiple low-compression portions 28, each of which is arranged between two adjacent high-compression portions 26. The low-compression portions 28 are made through thermal compression molding at a compression ratio lower than that of the high-compression portions 26.

The air permeability (as defined in JIS L 1096, A-method (Frazier method)) of the high-compression portion 26 is substantially 0 cm$^3$/cm$^2$·s. The thickness of the high-compression portion 26 is preferably from 0.5 to 1.5 mm. In the present embodiment, the thickness of the high-compression portion 26 is 0.7 mm.

The air permeability of the low-compression portion 28 is 3 cm$^3$/cm$^2$·s. The thickness of the low-compression portion 28 is preferably from 0.8 to 3.0 mm. In the present embodiment, the thickness of the low-compression portion 28 is 1.0 mm.

Each high-compression portion 26 has a rectangular shape, and its long sides and short sides extend along the circumferential direction and the axial direction of the main body 22, respectively. The high-compression portions 26 are spaced apart from each other both in the circumferential and axial directions.

Each low-compression portion 28 has sections each extending linearly in the axial direction throughout the length in the axial direction of the main body 22 and sections each extending in the circumferential direction of the main body 22.

As shown in FIG. 3, the high-compression portions 26 and the low-compression portions 28 are connected to each other via steps 29 on the outer surface of the duct member 20 while the high-compression portions 26 and the low-compression portions 28 are flush with each other on the inner surface of the duct member 20.

In the present embodiment, the area ratio of the high-compression portions 26 to the entire outer surface of the main body 22 of the duct member 20 is set within the range from 45% to 55%.

The end portions 24, 25 of the main body 22 have larger diameters than the main body 22.

The end portions 24, 25 of the main body 22 and the joining portions 32, 42 of the half bodies 30, 40 are made through thermal compression molding at a compression ratio equivalent to that of the high-compression portions 26 of the main body 22.

As shown in FIGS. 1 to 3, the connecting portion 12a of the upstream-side connecting member 12 is inserted into the upstream-side end portion 24 of the duct member 20. With the end portion 24 abutting against the flange portion 12b, the outer surface of the connecting portion 12a and the inner surface of the end portion 24 are joined together with an adhesive.

The first connecting portion 14a of the downstream-side connecting member 14 is inserted into the downstream-side end portion 25 of the duct member 20. With the end portion 25 abutting against the first flange portion 14b, the outer surface of the first connecting portion 14a and the inner surface of the end portion 25 are joined together with an adhesive.

The operation of the present embodiment will now be described.

As shown in FIGS. 4A to 4C, the positions corresponding to antinodes A of a standing wave of a sound wave of intake air, that is, the positions where the sound pressure of the standing wave is highest vary depending on the frequency (wavelength) of the standing wave. In an inlet duct, if there is a low-compression portion 28 having air permeability at a position corresponding to an antinode A of a standing wave of the sound wave of intake air, the pressure of the sound wave of the intake air is released through the low-compression portion 28. This effectively suppresses the generation of the standing wave.

In the inlet duct 10 of the present embodiment, the main body 22 of the duct member 20 has the low-compression portions 28 formed throughout the length in the axial direction. Thus, the low-compression portions 28 are present at positions corresponding to antinodes A of standing waves of various frequencies that can be generated inside the inlet duct 10. This reduces intake noise of a wide frequency range.

The high-compression portions 26 of the main body 22 of the duct member 20 do not allow air to pass through easily. Thus, as compared with the case in which the entire duct member 20 is formed by a low-compression portion 28, entry of air from the outside through the duct member 20 is limited. This reduces the thickness of the boundary layer formed in the vicinity of the inner surface of the duct member 20, that is, the thickness of the layer in which the involvement of the viscosity of the intake air is not negligible. Accordingly, it is possible to limit the increase in the airflow resistance of the main flow of intake air flowing from the inlet 16 to the outlet 18 of the inlet duct 10. This limits the increase in the pressure loss.

The above-described first embodiment achieves the following advantages.

(1) The inlet duct 10 for an internal combustion engine has the duct member 20, which is made of a compression molded fiber material (nonwoven fabric). The duct member 20 has the main body 22 and the end portions 24, 25. The main body 22 has the high-compression portions 26 and the low-compression portions 28, which are made through compression molding at a compression ratio lower than that of the high-compression portions 26. The end portions 24, 25 are made through thermal compression molding at a compression ratio equivalent to that of the high-compression portions 26 and provided at the opposite sides in the axial direction of the main body 22. The low-compression portions 28 extend throughout the length in the axial direction of the main body 22.

This configuration operates in the above-described manner and thus is capable of reducing intake noise of a wide frequency range.

Generally, as the length of an inlet duct increases, the airflow resistance increases, while the intake noise of lower frequencies is reduced. Even if the length is increased, the inlet duct 10 of the above-described embodiment is capable of limiting the increase in the airflow resistance as described above, while reducing the intake noise of lower frequencies.

(2) The high-compression portions 26 and the low-compression portions 28 are connected to each other via steps 29 on the outer surface of the duct member 20 while the high-compression portions 26 and the low-compression portions 28 are flush with each other on the inner surface of the duct member 20.

If steps are formed on the inner surface of the duct member 20 along with the formation of the high-compression portions 26 and the low-compression portions 28, the airflow resistance of the intake air flowing in the vicinity of the inner surface of the duct member 20 may increase.

In the above-described embodiment, since the high-compression portions 26 and the low-compression portions 28 are flush with each other on the inner surface of the duct member 20, the airflow resistance of the main flow of the intake air is not increased.

(3) The area ratio of the high-compression portions 26 to the entire outer surface of the main body 22 of the duct member 20 is set within the range from 45% to 55%.

If the area ratio of the high-compression portions 26 to the entire outer surface of the main body 22 of the duct member 20 is less than 30%, a boundary layer having a non-negligible thickness will be formed in the vicinity of the inner surface of the duct member 20 due to an excessively high proportion of the low-compression portions 28. This may hamper the effect of reducing the airflow resistance of the main flow of the intake air.

In contrast, if the area ratio of the high-compression portions 26 to the entire outer surface of the main body 22 of the duct member 20 is higher than 70%, the effect of reducing the sound pressure of the intake air may be reduced due to an excessively low proportion of the low-compression portions 28.

Since the above-described embodiment sets the area ratio of the high-compression portions 26 to the entire outer surface of the main body 22 of the duct member 20 within the range from 45% to 55%, the embodiment limits the increase in the pressure loss and ensures the advantage (1) of reducing intake noise of a wide frequency range.

(4) The duct member 20 has the high-compression portions 26, which are harder than the low-compression portions 28 and thus contribute to increasing the strength of the duct member 20.

Second Embodiment

Figure 5:
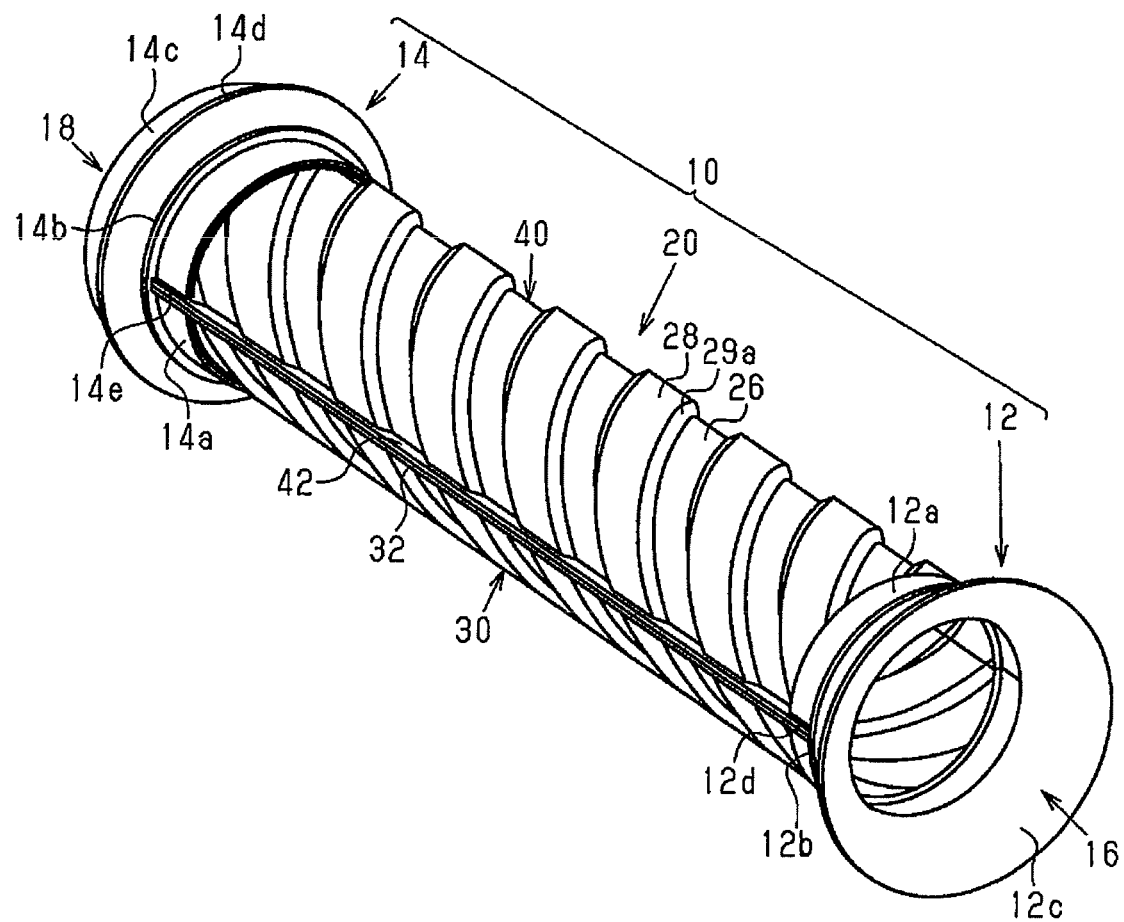
FIG. 5 is a perspective view of an inlet duct for an internal combustion engine according to a second embodiment.
Figure 6:
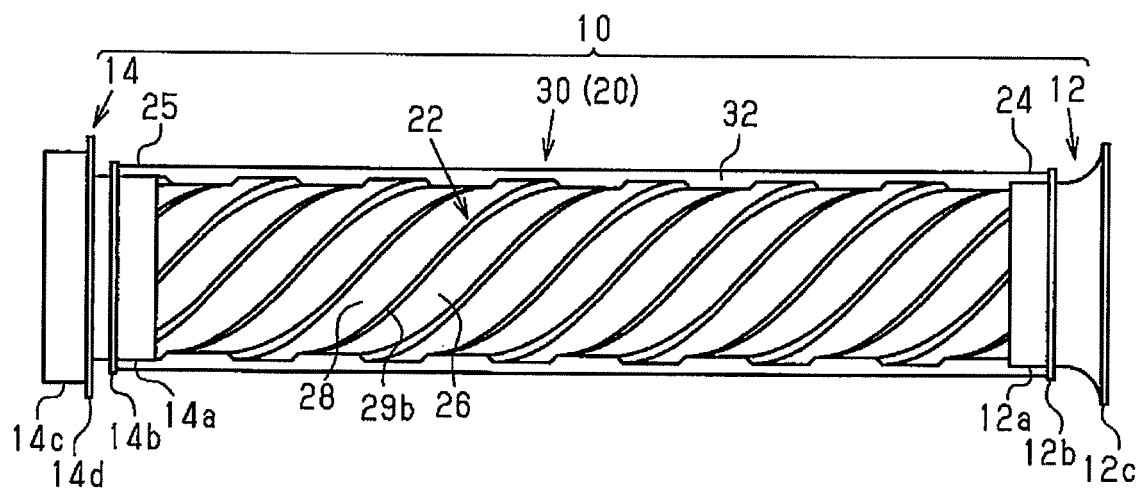
FIG. 6 is a plan view of the inlet duct shown in FIG. 5, from which the first half body is omitted.

With reference to FIGS. 5 and 6, differences between the second embodiment and the first embodiment will be mainly discussed. In the following description, like or the same reference numerals are given to those components that are like or the same as the corresponding components of the first embodiment, and detailed explanations are omitted.

<Upstream-Side Connecting Member 12>

As shown in FIG. 5, the connecting portion 12a of the upstream-side connecting member 12 has a pair of slits 12d extending in the axial direction at positions on the opposite sides of the center of the duct member 20.

<Downstream-Side Connecting Member 14>

As shown in FIG. 5, the first connecting portion 14a of the downstream-side connecting member 14 has a pair of slits 14e extending in the axial direction at positions on the opposite sides of the center of the duct member 20.

<Duct Member 20>

As shown in FIGS. 5 and 6, multiple high-compression portions 26 and multiple low-compression portions 28 are provided helically around the axis of the main body 22. Each low-compression portion 28 is located between two adjacent high-compression portions 26.

As shown in FIG. 5, the high-compression portions 26 and the low-compression portions 28 are helically provided on the outer surface of the duct member 20 and are connected to each other via steps 29a.

As shown in FIG. 6, the high-compression portions 26 and the low-compression portions 28 are helically provided on the inner surface of the duct member 20 and are connected to each other via steps 29b.

As shown in FIGS. 5 and 6, the connecting portion 12a of the upstream-side connecting member 12 is externally fitted to the upstream-side end portion 24 of the duct member 20. At this time, the ends of the pairs of joining portions 32, 42 of the half bodies 30, 40 are respectively inserted into the pair of slits 12d of the connecting portion 12a. With the pairs of the joining portions 32, 42 abutting against the flange portion 12b, the inner surface of the connecting portion 12a and the outer surface of the end portion 24 are joined together with an adhesive.

The first connecting portion 14a of the downstream-side connecting member 14 is externally fitted to the downstream-side end portion 25 of the duct member 20. At this time, the ends of the pairs of joining portions 32, 42 of the half bodies 30, 40 are respectively inserted into the pair of slits 14e of the first connecting portion 14a. With the pairs of the joining portions 32, 42 abutting against the first flange portion 14b, the inner surface of the first connecting portion 14a and the outer surface of the end portion 25 are joined together with an adhesive.

In addition to the advantages (1), (3), and (4) of the first embodiment, the second embodiment achieves the following advantage.

(5) The high-compression portions 26 and the low-compression portions 28 are helically provided on the inner surface of the duct member 20 and are connected to each other via the steps 29b.

With this configuration, the main flow of the intake air flowing from the inlet 16 to the outlet 18 of the inlet duct 10 swirls along the high-compression portions 26 and the low-compression portions 28, which are helically provided throughout the length in the axial direction of the main body 22. Therefore, the high-compression portion 26 and the low-compression portion 28 can be used to regulate the flow of the intake air.

Third Embodiment

Figure 7:
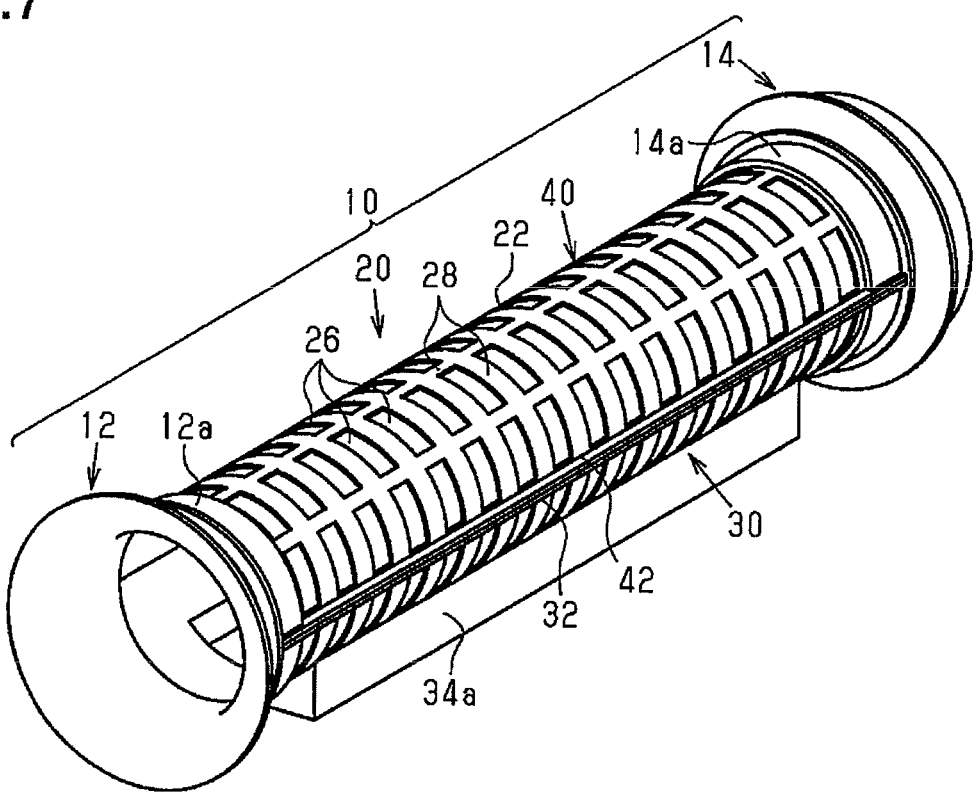
FIG. 7 is a perspective view of an inlet duct for an internal combustion engine according to a third embodiment.
Figure 8:
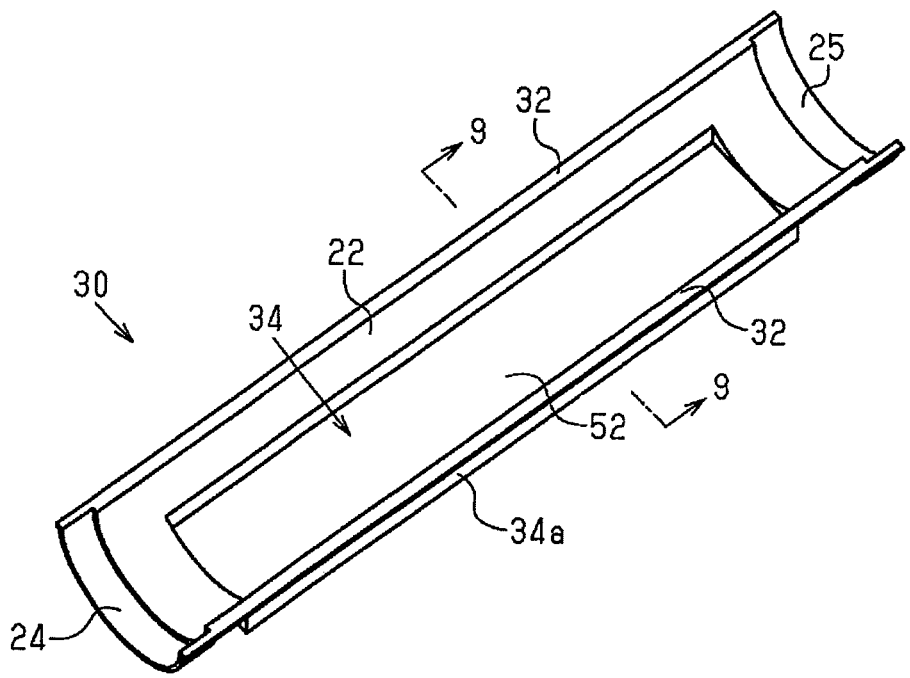
FIG. 8 is a perspective view as seen from inside of the first half body of the inlet duct shown in FIG. 7.
Figure 9:
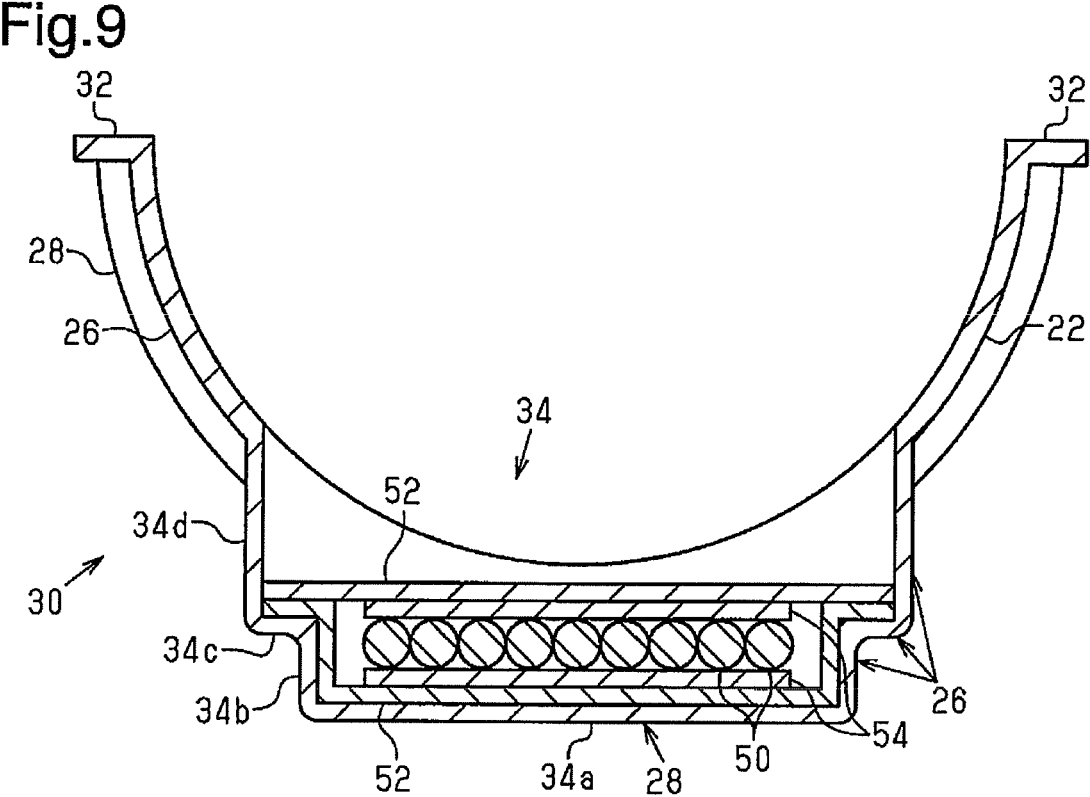
FIG. 9 is a cross-sectional view taken along line 9-9 of FIG. 8.

With reference to FIGS. 7 to 9, differences between the third embodiment and the first embodiment will be mainly discussed. In the following description, like or the same reference numerals are given to those components that are like or the same as the corresponding components of the first embodiment, and detailed explanations are omitted.

The connecting members 12, 14 of the present embodiment have the same structures as the connecting members 12, 14 of the second embodiment.

The second half body 40 constituting the duct member 20 of the present embodiment has the same structure as that of the first embodiment.

Next, with reference to FIGS. 8 and 9, the first half body 30 constituting the duct member 20 of the present embodiment will be described.

The first half body 30 has an accommodation portion 34, which bulges outward in the radial direction from the main body 22 and accommodates an adsorbent 50, which adsorbs fuel vapor of the internal combustion engine.

As shown in FIG. 9, the accommodation portion 34 includes a bottom wall 34a, which has a substantially rectangular shape in a plan view, a first side wall 34b, which surrounds the periphery of the bottom wall 34a, a shelf portion 34c, which extends outward from the upper end of the first side wall 34b, and a second side wall 34d, which surrounds the outer periphery of the shelf portion 34c and is connected to the main body 22.

The entire bottom wall 34a corresponds to a low-compression portion 28. In contrast, the first side wall 34b, the shelf portion 34c, and the second side wall 34d are correspond to high-compression portions 26.

The adsorbent 50 is, for example, activated carbon particles or the like. The adsorbent 50 is sandwiched between two glass fiber nets 54 and further sandwiched between two holding sheets 52.

The holding sheets 52 are constituted by, for example, nonwoven fabric of fibers of modified PET.

The nonwoven fabric constituting the holding sheets 52 may be composed of known sheath-core bicomponent fibers including cores made of, for example, PET and sheaths made of a modified PET having a melting point lower than that of the PET of the cores or PP (none is illustrated).

The weight per unit area of the nonwoven fabric constituting the holding sheets 52 is preferably 30 to 150 g/m$^2$. In the present embodiment, the weight per unit area of the nonwoven fabric is 60 g/m$^2$.

The thickness of each holding sheets 52 is preferably from 0.1 to 1.5 mm. In the present embodiment, the thickness of each holding sheet 52 is 0.3 mm.

The two holding sheets 52, which hold the adsorbent 50 sandwiched between the two glass fiber nets 54, are placed on the bottom wall 34a of the accommodation portion 34, and the edges of the holding sheets 52 are placed on the shelf portion 34c. In this state, the edges of the holding sheets 52 are fixed to the shelf portion 34c by ultrasonic welding.

The above-described third embodiment achieves the following advantages.

(6) The duct member 20 has the accommodation portion 34, which bulges outward in the radial direction from the main body 22 and accommodates the adsorbent 50, which adsorbs fuel vapor of the internal combustion engine. The bottom wall 34a of the accommodation portion 34 corresponds to a low-compression portion 28.

With this configuration, since the bottom wall 34a of the accommodation portion 34 corresponds to a low-compression portion 28, air enters from the outside through the bottom wall 34a. Since the fuel component once adsorbed by the adsorbent 50 is purged by that air, the fuel purging performance is improved.

(7) The adsorbent 50 is sandwiched between the two holding sheets 52, which are made of nonwoven fabric. The shelf portion 34c is formed around the bottom wall 34a of the accommodation portion 34. The edges of the holding sheets 52 are fixed to the shelf portion 34c. The shelf portion 34c corresponds to a high-compression portion 26.

With this configuration, since the shelf portion 34c corresponds to a high-compression portion 26, the shelf portion 34c has a suitable hardness and the edges of the holding sheets 52 are reliably fixed to the shelf portion 34c.

MODIFICATIONS

The above-described embodiments may be modified as follows.

In the third embodiment, the manner of fixing the edges of the holding sheets 52 to the shelf portion 34c is not limited to ultrasonic welding. Alternatively, for example, an adhesive may be used for fixation. Further, the edges of the holding sheets 52 may be fixed to the bottom wall 34a of the accommodation portion 34.

The bottom wall 34a of the accommodation portion 34 may partly or entirely correspond to a high-compression portion 26.

The area ratio of the high-compression portions 26 to the entire outer surface of the main body 22 of the duct member 20 may be set within the range from 30% to 45%. Also, the area ratio of the high-compression portions 26 may be set slightly lower than 30%.

The area ratio of the high-compression portions 26 to the entire outer surface of the main body 22 of the duct member 20 may be set within the range from 55% to 70%. Also, the area ratio of the high-compression portions 26 may be set slightly higher than 70%.

Figure 10:
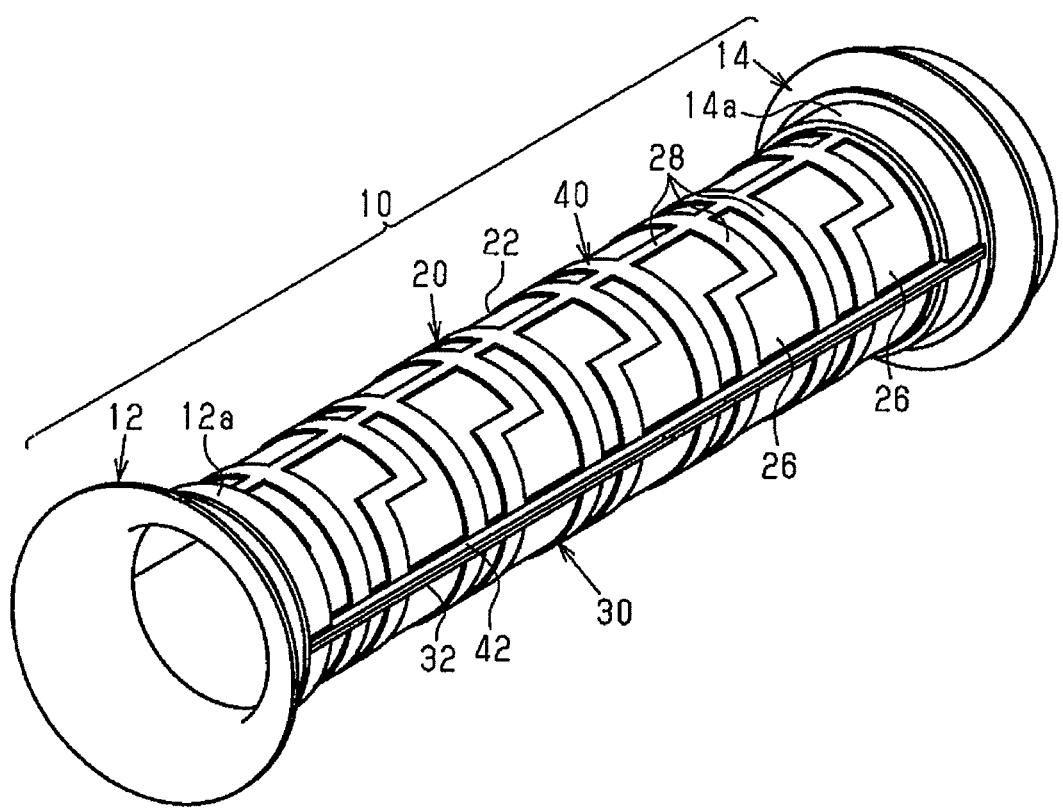
FIG. 10 is a perspective view of an inlet duct for an internal combustion engine according to a modified embodiment.
Figure 11:
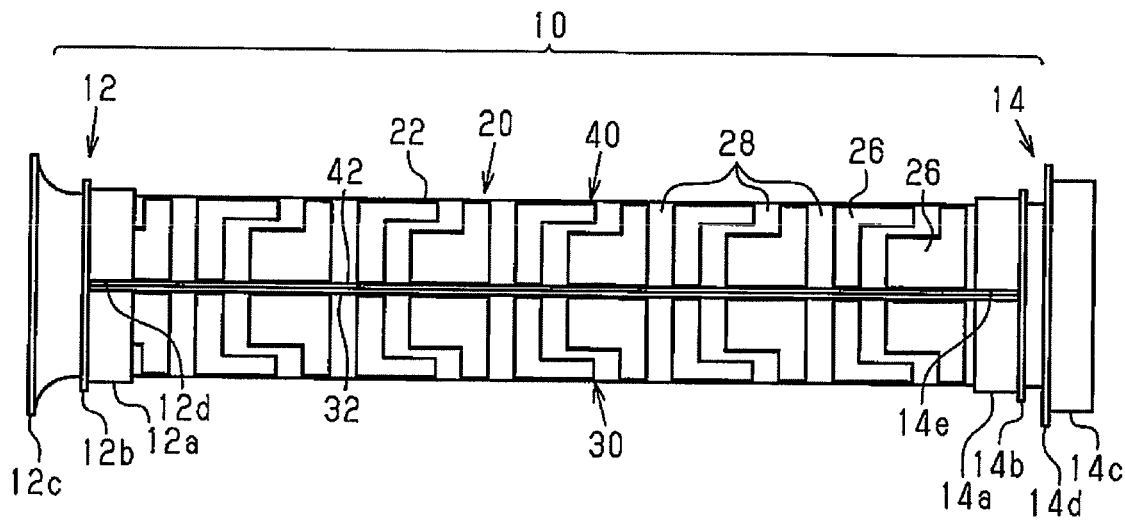
FIG. 11 is a side view of the inlet duct shown in FIG. 10.

As long as the low-compression portions 28 are provided throughout the length in the axial direction of the main body 22, the shapes of the high-compression portions 26 may be changed as necessary. FIGS. 10 and 11 show an example of this modification to the first embodiment. In this modification, some of the low-compression portions 28 that are located either between two high-compression portions 26 adjacent to each other in the circumferential direction or between two high-compression portions 26 adjacent to each other in the axial direction are changed to high-compression portions 26.

Figure 12:
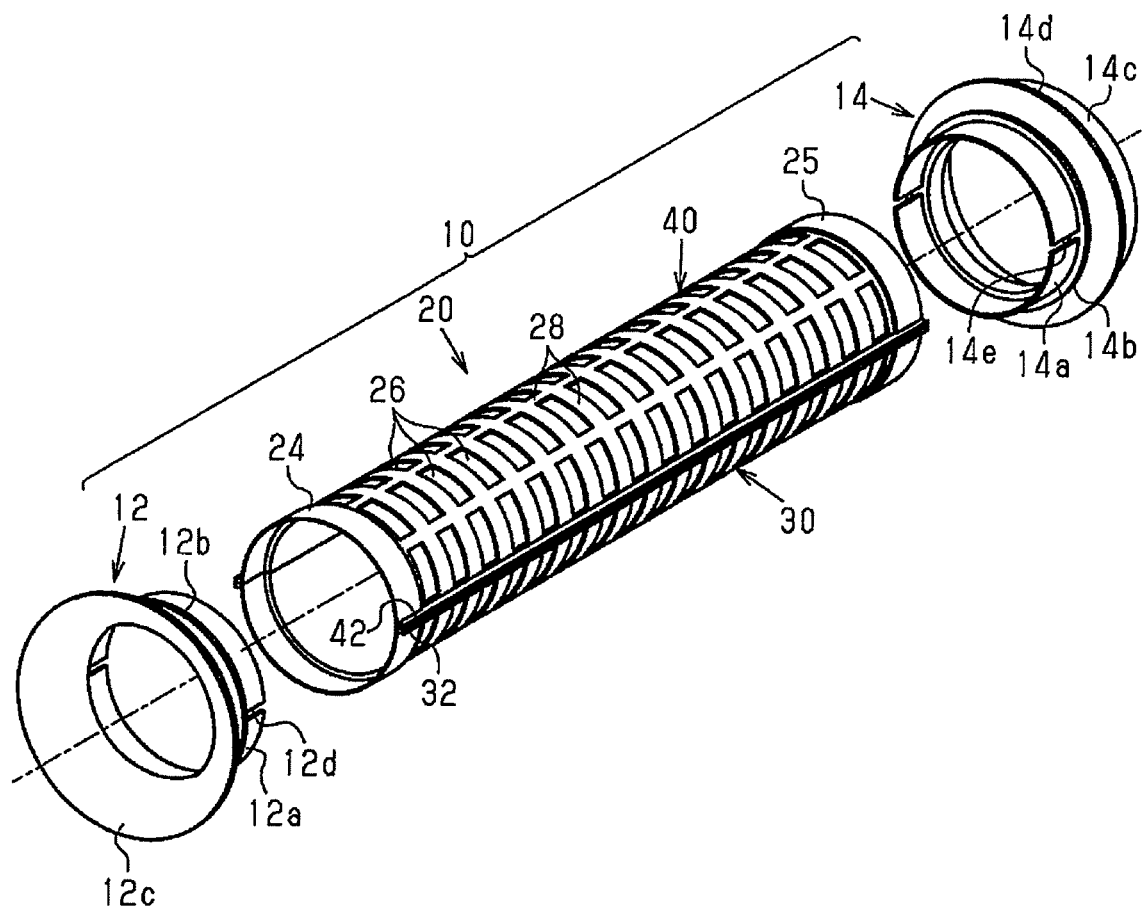
FIG. 12 is an exploded perspective view of an inlet duct for an internal combustion engine according to another modified embodiment, illustrating a state in which an upstream-side connecting member, a duct member, and a downstream-side connecting member, which constitute the inlet duct, are separated from each other.

As shown in FIG. 12, the connecting members 12, 14 illustrated in the second embodiment may be applied to the duct member 20 illustrated in the first embodiment.

The shapes of the high-compression portions 26 may be changed, for example, to letters, figures, or identification symbols associated with the inlet duct 10 or the duct member 20.

In each of the above-described embodiments and modifications, the end portions 24 and 25 of the duct member 20 are made through thermal compression molding at a compression ratio equivalent to that of the high-compression portions 26. However, the present disclosure is not limited to those in which the entire end portions 24, 25 are high-compression sections. That is, at least one of the end portions 24, 25 may have a portion that is made through thermal compression molding at a compression ratio equivalent to that of the low-compression portions 28 of the main body 22.

Therefore, the present examples and embodiments are to be considered as illustrative and not restrictive and the invention is not to be limited to the details given herein, but may be modified within the scope and equivalence of the appended claims.

The invention claimed is:

1. An inlet duct for an internal combustion engine comprising a duct member made of a compression molded fiber material, wherein
the duct member includes a main body and a first end portion and a second end portion provided on opposite sides in an axial direction of the main body,
the main body includes a first half cylinder body and a second half cylinder body,
each of the first half cylinder body and the second half cylinder body includes joining portions at opposite ends in a circumferential direction of the main body,
the joining portions of the first half cylinder body and the joining portions of the second half cylinder body are joined together,
the main body includes multiple high-compression portions and at least one low-compression portion, which is made through compression molding at a compression ratio lower than a compression ratio of the multiple high-compression portions, the multiple high-compression portions and the at least one low-compression portion being provided in the main body other than the joining portions of the first half cylinder body and the joining portions of the second half cylinder body,
the multiple high-compression portions are spaced apart from each other both in the circumferential direction and the axial direction of the main body, and
the at least one low-compression portion comprises a line portion that continuously extends between the first end portion and the second end portion throughout a length in the axial direction of the main body.

2. The inlet duct according to claim 1, wherein an area ratio of the multiple high-compression portions to an entire outer surface of the main body of the duct member is within a range from 30% to 70%.

3. The inlet duct according to claim 1, wherein the multiple high-compression portions and the at least one low-compression portion are connected to each other via a step on an outer surface of the duct member, while being flush with each other on an inner surface of the duct member.

4. An inlet duct for an internal combustion engine comprising a duct member made of a compression molded fiber material, wherein
the duct member includes a main body and end portions provided on opposite sides in an axial direction of the main body,
the main body includes multiple high-compression portions and multiple low-compression portions, which are made through compression molding at a compression ratio lower than a compression ratio of the multiple high-compression portions,
the multiple high-compression portions and the multiple low-compression portions are helically provided on an inner surface of the duct member and are connected to each other via a step,
the multiple high-compression portions are spaced apart from each other both in a circumferential direction and the axial direction of the main body, and
the multiple low-compression portions continuously extend about at least half of the circumferential length of the main body.

5. The inlet duct according to claim 1, wherein
the duct member includes an accommodation portion, which bulges outward in a radial direction from the main body and accommodates an adsorbent to adsorb fuel vapor of the internal combustion engine, and
the at least one low-compression portion includes a bottom wall of the accommodation portion.

6. The inlet duct according to claim 5, wherein
the adsorbent is sandwiched between two holding sheets made of a fiber material,
the accommodation portion includes a shelf portion surrounding the bottom wall, edges of the holding sheets being fixed to the shelf portion, and
the multiple high-compression portions include the shelf portion.

7. The inlet duct according to claim 5, wherein the bottom wall of the accommodation portion has a rectangular shape in a plan view.

8. The inlet duct according to claim 7, wherein the rectangular shape of the bottom wall has a short side having a length smaller than a diameter of the main body.

9. The inlet duct according to claim 5, wherein the accommodation portion further comprises:
a first side wall surrounding a periphery of the bottom wall;
a shelf portion extending outward from an upper end of the first side wall; and
a second side wall surrounding an outer periphery of the shelf portion and connected to the main body.

10. The inlet duct according to claim 4, wherein
the main body includes a first half cylinder body and a second half cylinder body;
each of the first half cylinder body and the second half cylinder body includes joining portions at opposite ends in the circumferential direction,
the joining portions of the first half cylinder body and the joining portions of the second half cylinder body are joined together, and
the multiple low-compression portions continuously extend from one of the joining portions to the other of the joining portions of the first half cylinder body in the circumferential direction.

* * * * *